US012691949B2

(12) United States Patent
Nishigami et al.

(10) Patent No.: US 12,691,949 B2
(45) Date of Patent: Jul. 28, 2026

(54) LOWER STRUCTURE OF VEHICLE

(71) Applicant: Honda Motor Co., Ltd., Tokyo (JP)

(72) Inventors: Ryuta Nishigami, Tokyo (JP);
Hirotaka Hayakawa, Tokyo (JP);
Tetsuya Sugizaki, Tokyo (JP); **Kazuya
Kimura, Tokyo (JP); Ryo Shinoda**,
Tokyo (JP)

(73) Assignee: Honda Motor Co., Ltd., Tokyo (JP)

( * ) Notice: Subject to any disclaimer, the term of this
patent is extended or adjusted under 35
U.S.C. 154(b) by 318 days.

(21) Appl. No.: 18/407,483

(22) Filed: Jan. 9, 2024

(65) Prior Publication Data

US 2024/0326923 A1      Oct. 3, 2024

(30) Foreign Application Priority Data

Mar. 30, 2023    (CN) .......................... 202310327701.5

(51) Int. Cl.
*B62D 25/20*        (2006.01)
*B60K 1/04*          (2019.01)
*B62D 25/24*        (2006.01)

(52) U.S. Cl.
CPC ...... *B62D 25/20* (2013.01); *B60K 2001/0466*
(2013.01); *B60K 2001/0483* (2013.01); *B62D
25/24* (2013.01)

(58) Field of Classification Search
CPC .......... B62D 25/20; B62D 25/24; B60K 1/04;
B60K 2001/0438; B60K 2001/0422;
B60K 2001/0433; B60K 2001/0416;
B60K 2001/0466; B60K 2001/0483;
H01M 50/202; H01M 50/249; H01M
50/271

USPC .............. 296/193.07, 187.08, 204; 180/68.5
See application file for complete search history.

(56) References Cited

U.S. PATENT DOCUMENTS

| | | | | |
|---|---|---|---|---|
| 1,493,834 A | * | 5/1924 | Ward | ...................... B60L 50/64 |
| | | | | 180/68.5 |
| 2009/0166116 A1 | * | 7/2009 | Kiya | ................... H01M 50/209 |
| | | | | 180/68.5 |
| 2013/0277130 A1 | * | 10/2013 | Katou | .................. B62D 25/087 |
| | | | | 180/68.5 |
| 2022/0314775 A1 | * | 10/2022 | Mukumoto | .............. B60K 1/04 |
| 2023/0101105 A1 | * | 3/2023 | Hayakawa | .............. B60L 50/66 |
| | | | | 180/68.5 |
| 2023/0101857 A1 | * | 3/2023 | Hayakawa | ............... B60K 1/04 |
| | | | | 180/68.5 |

FOREIGN PATENT DOCUMENTS

JP            2015214233        12/2015

* cited by examiner

*Primary Examiner* — Roger L Pang
(74) *Attorney, Agent, or Firm* — JCIPRNET

(57) ABSTRACT

The disclosure provides a lower structure of vehicle in
which a battery covering portion has a rigidity capable of
supporting the load of an impact. The lower structure of
vehicle includes: a floor base plate, including a floor beam
disposed on an upper surface, and the floor beam extending
in a vehicle width direction; a battery component disposed
at the rear of the floor beam in a front and rear direction of
the vehicle; and a battery cover portion covering above the
battery component, and the battery cover portion including
multiple connection portions connected to the floor beam.
The battery covering portion is formed of a steel material,
and the connection portions are disposed staggered from
each other in height positions in an upward and downward
direction of the vehicle.

9 Claims, 3 Drawing Sheets

136

138

130

110

120

112

100

132b(132)

114

134

132c(132)

132a(132)

Z

X

Y

100

138a(138)

130

134

114a(114)

132a(132)

112a(112)

132c(132)

A

132b(132)

L

Z

X

Y

LOWER STRUCTURE OF VEHICLE

CROSS-REFERENCE TO RELATED APPLICATION

This application claims the priority benefit of China application serial no. 202310327701.5, filed on Mar. 30, 2023. The entirety of the above-mentioned patent application is hereby incorporated by reference herein and made a part of this specification.

BACKGROUND

Technical Field

This disclosure relates to a lower structure of vehicle.

Description of Related Art

In order to use a sustainable transportation system that takes into account the disadvantaged groups such as the elderly, the physically challenged, and children, people have been working to provide a vehicle that has better vehicle body rigidity. In the existing technology, the battery component is protected by a battery covering portion formed by resin and a thin plate portion. However, the rigidity of such a battery covering portion is obviously not able to cope with a large load such as in the event of a crash. The disclosure aims at protecting the battery component in order to solve the above-mentioned problem. In addition, the disclosure contributes to the development of a sustainable transportation system by further improving the rigidity of the vehicle body.

SUMMARY

The disclosure provides a lower structure of vehicle in which a battery covering portion has a rigidity capable of supporting the load of an impact.

The lower structure of vehicle includes: a floor base plate, including a floor beam disposed on an upper surface, and the floor beam extending in a vehicle width direction; a battery component disposed at the rear of the floor beam in a front and rear direction of the vehicle; and a battery cover portion covering above the battery component, and the battery cover portion including multiple connection portions connected to the floor beam. The battery covering portion is formed of a steel material, and the connection portions are disposed staggered from each other in height positions in an upward and downward direction of the vehicle.

In an embodiment of the disclosure, the connection portions include an outer connection portion disposed close to an outer side in the vehicle width direction, an inner connection portion disposed close to an inner side in the vehicle width direction, and a central connection portion disposed between the outer connection portion and the inner connection portion. The central connection portion is disposed higher in the upward and downward direction of the vehicle than the outer connection portion and the inner connection portion.

In an embodiment of the disclosure, the outer connection portion is disposed lower in the upward and downward direction of the vehicle than the inner connection portion and the central connection portion.

In an embodiment of the disclosure, the floor base plate further includes a floor channel, and the floor channel is disposed on a central side of the floor base plate in the vehicle width direction and extends in the front and rear direction of the vehicle. An extension line extending from the outer connection portion toward the central connection portion intersects an upper surface of the floor channel.

In an embodiment of the disclosure, the inner connection portion is disposed lower in the upward and downward direction of the vehicle than the extension line.

In an embodiment of the disclosure, the battery covering portion includes: a front wall provided with the connection portions, and extending in the upward and downward direction of the vehicle; an upper wall extending from an upper end of the front wall toward the rear in the front and rear direction of the vehicle; and a ridge portion disposed between the front wall and the upper wall.

In an embodiment of the disclosure, the upper wall includes an upper connection portion, and the upper connection portion is connected to the floor beam at an outer end portion of the upper wall in the vehicle width direction. The ridge portion is sandwiched between the upper connection portion and the outer connection portion.

In an embodiment of the disclosure, the ridge portion includes a ridge curved portion, and the ridge curved portion is curved on an outer side in the vehicle width direction. The floor beam includes a gradually expanding portion, and the gradually expanding portion gradually expands upward on the outer side in the vehicle width direction. A position of the central connection portion is set to be further inward than the ridge curved portion in the vehicle width direction, and the central connection portion overlaps the gradually expanding portion in a viewing angle in the front and rear direction of the vehicle.

In an embodiment of the disclosure, the connection portions are connected to each other by imaginary lines and form a triangular imaginary area.

Based on the above, in the lower structure of vehicle of the disclosure, the connection portions are staggered in height in the upward and downward direction of the vehicle, respectively. As a result, the load at the time of impact may be dispersed, and damage caused by stress concentration may be suppressed. Moreover, the problem of deformation may be suppressed without the need for a reinforcement structure or shape. Accordingly, the battery covering portion of the disclosure has a rigidity capable of supporting the load of an impact.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
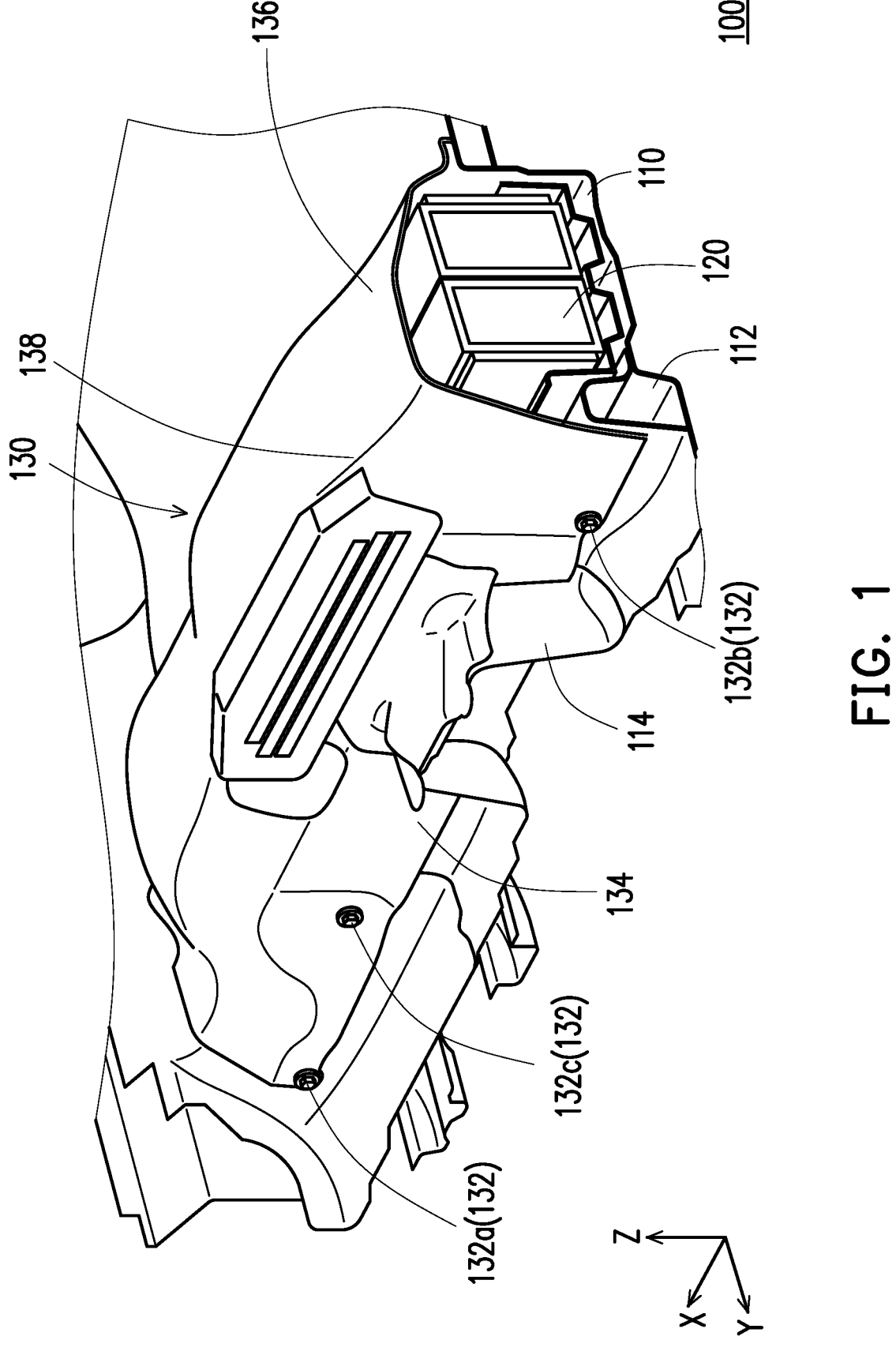
FIG. 1 is a partially cross-sectional three-dimensional schematic view of a lower structure of vehicle according to an embodiment of the disclosure.
Figure 2:
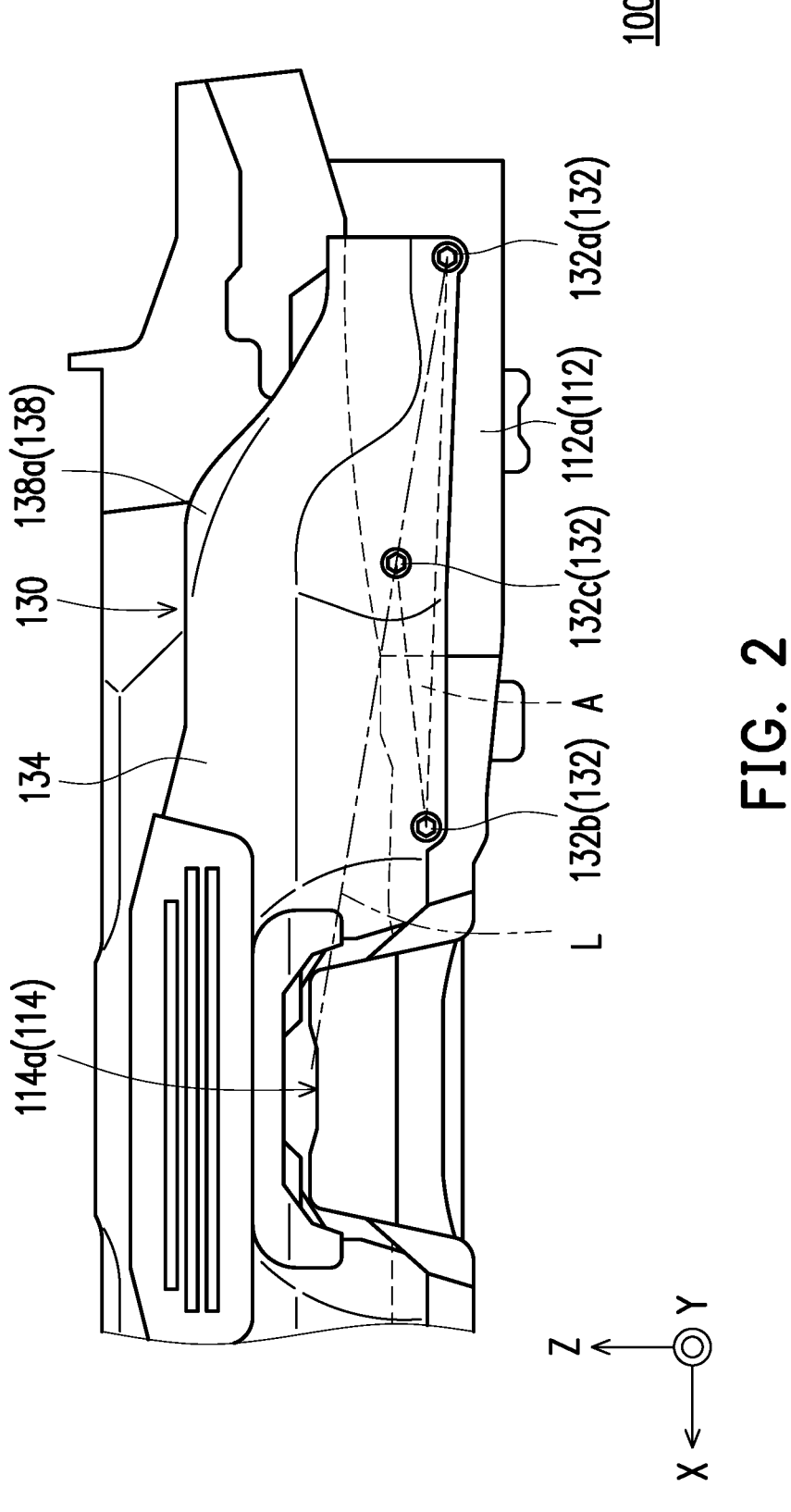
FIG. 2 is a partial front view of the lower structure of vehicle of FIG. 1.
Figure 3:
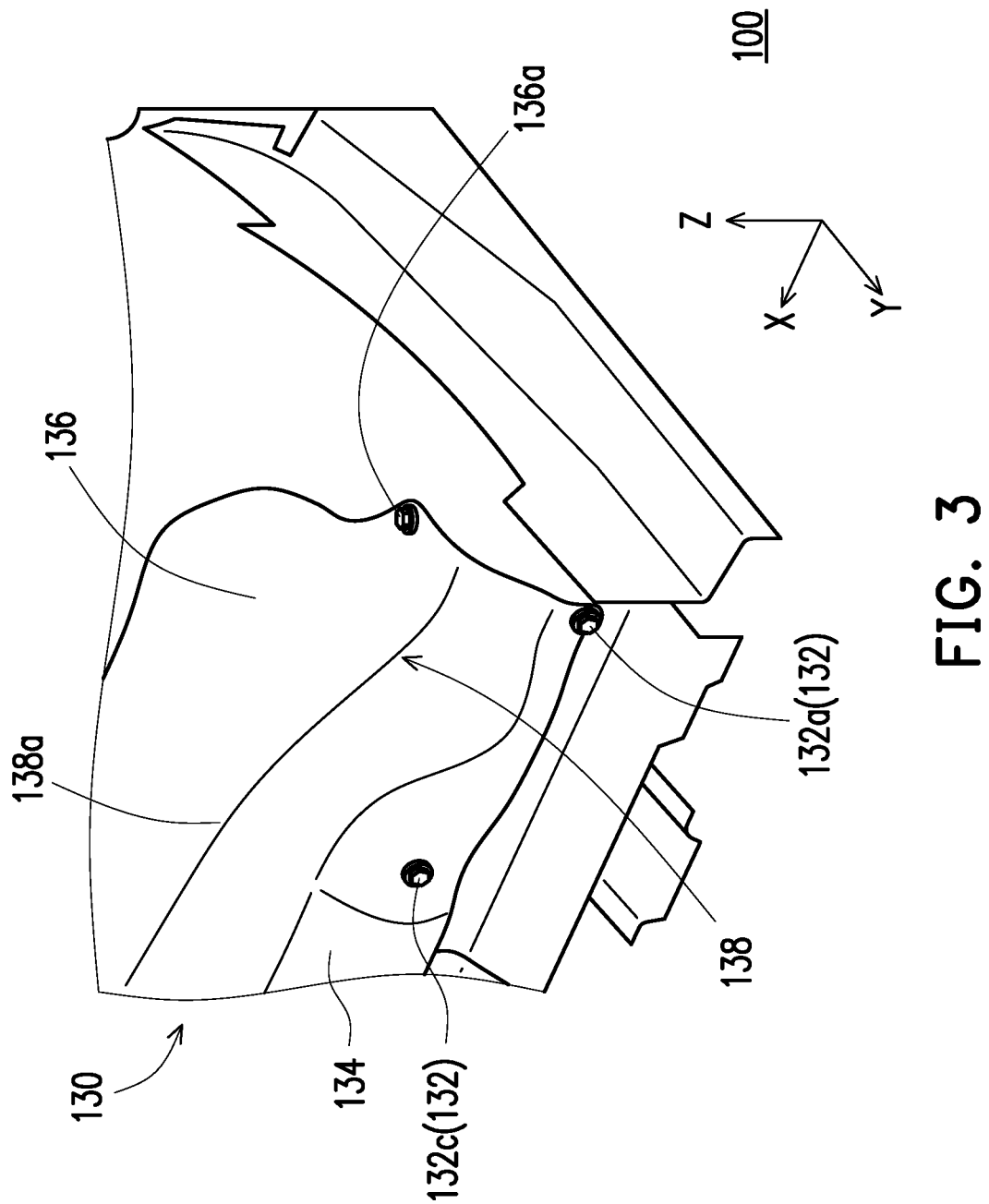
FIG. 3 is a partial three-dimensional schematic view of the lower structure of vehicle of FIG. 1.

FIG. 1 is a partially cross-sectional three-dimensional schematic view of a lower structure of vehicle according to an embodiment of the disclosure. FIG. 2 is a partial front view of the lower structure of vehicle of FIG. 1. FIG. 3 is a partial three-dimensional schematic view of the lower structure of vehicle of FIG. 1. In this embodiment, a lower structure of vehicle 100 is, for example, a lower structure applied in an ordinary passenger car (not shown), but could also be in a device applied in other similar structures, and the disclosure is not limited thereto. Since the lower structure of vehicle 100 is a symmetrical structure, for convenience of explanation, FIG. 1 to FIG. 3 are all shown in half or partial form. A vehicle width direction X, a front and rear direction Y of the vehicle, and an upward and downward direction Z of the vehicle in the drawings are not intended to limit the positional relationship of each component in the disclosure. In addition, it should be noted that, unless otherwise specified, the front and upward in the following descriptions are the directions indicated by arrows in the front and rear direction Y of the vehicle and the upward and downward direction Z of the vehicle, and the rear and downward in the descriptions are the opposite of the foregoing directions; the inner and outer sides in the descriptions are relative to the position in the vehicle width direction X, and the direction indicated by the arrow in the vehicle width direction X is not intended to limit the inner or outer sides. Whenever possible, the same numeral references are used in the drawings and descriptions to refer to the same or similar parts. The lower structure of vehicle 100 of this embodiment is described below with reference to FIG. 1 to FIG. 3.

Referring to FIG. 1, in this embodiment, the lower structure of vehicle 100 includes a floor base plate 110, a battery component 120, and a battery covering portion 130. The floor base plate 110 includes a floor beam 112 disposed on an upper surface. The floor beam 112 extends in a vehicle width direction X. The battery component 120 is disposed at the rear of the floor beam 112 in a front and rear direction Y of the vehicle, and is disposed on an upper surface of the floor base plate 110. The battery covering portion 130 covers above the battery component 120, and the battery covering portion 130 includes multiple connection portions 132 connected to the floor beam 112. Specifically, the battery cover 130 is formed of a steel material and surrounds the left, right, front, rear, and top of the battery component 120. The connection portions 132 of the battery covering portion 130 are connected to the front of the floor beam 112 in the front and rear direction Y of the vehicle, but may also be connected elsewhere, and the disclosure is not limited thereto. The connection portions 132 are disposed staggered from each other in height positions in the upward and downward direction Z of the vehicle. That is, the connection portions 132 are not disposed on the same horizontal line.

It can be seen from this that in the lower structure of vehicle 100 of this embodiment, the connection portions 132 of the battery covering portion 130 are staggered in height in the upward and downward direction Z of the vehicle, respectively. As a result, the load at the time of impact may be dispersed, and damage caused by stress concentration may be suppressed. Moreover, the problem of deformation may be suppressed without the need for a reinforcement structure or shape. Accordingly, the battery covering portion 130 of the embodiment has a rigidity capable of supporting the load of an impact.

Referring to FIG. 2, in this embodiment, the connection portions 132 include an outer connection portion 132a disposed close to an outer side in the vehicle width direction X, an inner connection portion 132b disposed close to an inner side in the vehicle width direction X, and a central connection portion 132c disposed between the outer connection portion 132a and the inner connection portion 132b. The central connection portion 132c is disposed higher in the upward and downward direction Z of the vehicle than the outer connection portion 132a and the inner connection portion 132b. In addition, the floor base plate 110 further includes a floor channel 114, which is disposed on a center side of the floor base plate 110 in the vehicle width direction X. Specifically, the floor channel 114 extends in the front and rear direction Y of the vehicle, and from a viewing angle in the front and rear direction Y of the vehicle, the floor channel 114 is formed into a hat shape with an opening facing downward (as shown in FIG. 2). However, the disclosure is not limited thereto. Furthermore, an extension line L from the outer connection portion 132a toward the central connection portion 132c intersects an upper surface 114a of the floor channel 114. As a result, the load generated by the impact may be conducted more efficiently above the floor channel 114, and thus the deformation at the location where the floor channel 114 is located (near the center on the vehicle width direction X) is suppressed.

Furthermore, the outer connection portion 132a is disposed lower in the upward and downward direction Z of the vehicle than the inner connection portion 132b and the central connection portion 132c, so that the load may be more easily distributed to the battery covering portion 130 and the floor beam 112. In addition, the inner connection portion 132b is disposed lower in the upward and downward direction Z of the vehicle than the extension line L, so that the force in a shear direction of the battery covering portion 130 may be lifted in order to inhibit the damage caused by the impact load, and there is no need to provide a reinforcement structure or shape to inhibit deformation near the area where the battery component 120 is located. In addition, the connection portions 132 (the outer connection portion 132a, the inner connection portion 132b, and the central connection portion 132c) are connected to each other by imaginary lines and form a triangular imaginary area A, which makes it easier to conduct and distribute the load to each place, and reduces the situation of stress concentration. In other embodiments not shown, the connection portions 132, when connected to each other, may also enclose other imaginary regions of shapes suitable for spreading the load, and are not limited to a triangular shape.

Referring to FIG. 2 and FIG. 3, in this embodiment, the battery covering portion 130 includes a front wall 134, an upper wall 136 (as shown in FIG. 3), and a ridge portion 138. The front wall 134 is provided with multiple connection portions 132 and extends in the upward and downward direction Z of the vehicle to cover the front of the battery component 120 in the front and rear direction Y of the vehicle. The upper wall 136 extends from an upper end of the front wall 134 toward the rear in the front and rear direction Y of the vehicle to cover the upward part of the battery component 120 in the upward and downward direction Z of the vehicle and the rear in the front and rear direction Y of the vehicle. The ridge portion 138 is disposed between the front wall 134 and the upper wall 136. Specifically, the ridge portion 138 is disposed at the intersection of the front wall 134 and the upper wall 136 to form a curved transition area between the front wall 134 and the upper wall 136. Such a configuration ensures that the load from the side is efficiently conducted along the ridge portion 138, thereby suppressing deformation of the battery covering portion 130.

As shown in FIG. 3, in this embodiment, the upper wall 136 includes an upper connection portion 136a. The upper connection portion 136a connects an upper surface of the floor beam 112 at an outer end portion of the upper wall 136 in the vehicle width direction X. A ridge portion 138 is sandwiched between the upper connection portion 136a and the outer connection portion 132a. As a result, the load transferred from each connection portion (the connection portions 132 and the upper connection portion 136a) may be efficiently conducted to the ridge portion 138 to achieve the effect that the connection portions and the ridge portion 138 jointly disperse the load, thereby suppressing the deformation of the battery covering portion 130.

Please return to FIG. 2. In this embodiment, the ridge portion 138 includes a ridge curved portion 138a, and the ridge curved portion 138a is curved on an outer side in the vehicle width direction X. For example, from a viewing angle of FIG. 2, the ridge portion 138 extends from the outer side of the vehicle width direction X toward the inner side and toward the upper side of the upward and downward direction Z of the vehicle, and is bent at the ridge curved portion 138a and then extends horizontally toward the inner side of the vehicle width direction X. In other embodiments not shown, the ridge curved portion 138a may also be curved in other directions, and may be adjusted according to actual needs, and the disclosure is not limited thereto. The floor beam 112 includes a gradually expanding portion 112a, and the gradually expanding portion 112a gradually expands upward on the outer side in the vehicle width direction X. A position of the central connection portion 132c is set to be further inward than the ridge curved portion 138a in the vehicle width direction X, and the central connection portion 132c overlaps the gradually expanding portion 112a in a viewing angle in the front and rear direction Y of the vehicle. In this way, the load transmitted to the ridge curved portion 138a and the gradually expanding portion 112a as the bending point may be reduced to further suppress deformation.

To sum up, in the lower structure of vehicle of the disclosure, the connection portions are staggered in height in the upward and downward direction of the vehicle, respectively. As a result, the load at the time of impact may be dispersed, and damage caused by stress concentration may be suppressed. Moreover, the problem of deformation may be suppressed without the need for a reinforcement structure or shape. In particular, the connection portions include an outer connection portion, an inner connection portion, and a central connection portion. The central connection portion is disposed higher than the outer connection portion and the inner connection portion. The outer connection portion is disposed lower than the inner connection portion and the central connection portion. In this way, the load generated by the impact may be conducted more efficiently above the floor channel, and the force in a shear direction of the battery covering portion may be lifted in order to inhibit the damage caused by the impact load. Accordingly, the battery covering portion of the disclosure has a rigidity capable of supporting the load of an impact.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lower structure of vehicle, comprising:
   a floor base plate, comprising a floor beam disposed on an upper surface, the floor beam extending in a vehicle width direction;
   a battery component, disposed at a rear of the floor beam in a front and rear direction of the vehicle; and
   a battery covering portion, covering above the battery component, the battery covering portion comprising a plurality of connection portions connected to the floor beam, wherein
      the battery covering portion is formed of a steel material, and
      the connection portions are disposed staggered from each other in height positions in an upward and downward direction of the vehicle, wherein
   the connection portions comprise an outer connection portion disposed close to an outer side in the vehicle width direction, an inner connection portion disposed close to an inner side in the vehicle width direction, and a central connection portion disposed between the outer connection portion and the inner connection portion, wherein
   the central connection portion is disposed higher in the upward and downward direction of the vehicle than the outer connection portion and the inner connection portion.

2. The lower structure of vehicle according to claim 1, wherein
   the outer connection portion is disposed lower in the upward and downward direction of the vehicle than the inner connection portion and the central connection portion.

3. The lower structure of vehicle according to claim 1, wherein
   the floor base plate further comprises a floor channel, and the floor channel is disposed on a central side of the floor base plate in the vehicle width direction and extends in the front and rear direction of the vehicle, wherein
      an extension line extending from the outer connection portion toward the central connection portion intersects an upper surface of the floor channel.

4. The lower structure of vehicle according to claim 3, wherein
   the inner connection portion is disposed lower in the upward and downward direction of the vehicle than the extension line.

5. The lower structure of vehicle according to claim 1, wherein the battery covering portion comprises:
   a front wall, provided with the connection portions, and extending in the upward and downward direction of the vehicle;
   an upper wall, extending from an upper end of the front wall toward the rear in the front and rear direction of the vehicle; and
   a ridge portion, disposed between the front wall and the upper wall.

6. The lower structure of vehicle according to claim 5, wherein
   the upper wall comprises an upper connection portion, the upper connection portion is connected to the floor beam at an outer end portion of the upper wall in the vehicle width direction,
   the ridge portion is sandwiched between the upper connection portion and the outer connection portion.

7. The lower structure of vehicle according to claim 5, wherein
   the ridge portion comprises a ridge curved portion, and the ridge curved portion is curved on an outer side in the vehicle width direction, the floor beam comprises a gradually expanding portion,
the gradually expanding portion gradually expands
upward on the outer side in the vehicle width direction,
a position of the central connection portion is set to be
further inward than the ridge curved portion in the
vehicle width direction, and the central connection
portion overlaps the gradually expanding portion in a
viewing angle in the front and rear direction of the
vehicle.

8. The lower structure of vehicle according to claim 1,
wherein
the connection portions are connected to each other by
imaginary lines and form a triangular imaginary area.

9. A lower structure of vehicle, comprising:
a floor base plate, comprising a floor beam disposed on an
upper surface, the floor beam extending in a vehicle
width direction;
a battery component, disposed at a rear of the floor beam
in a front and rear direction of the vehicle; and
a battery covering portion, covering above the battery
component, the battery covering portion comprising a
plurality of connection portions connected to the floor
beam, wherein
the battery covering portion is formed of a steel mate-
rial, and
the connection portions are disposed staggered from
each other in height positions in an upward and
downward direction of the vehicle, wherein
the connection portions are connected to each other by
imaginary lines and form a triangular imaginary area.

* * * * *